US011084216B2

(12) United States Patent
Murillo et al.

(10) Patent No.: US 11,084,216 B2
(45) Date of Patent: Aug. 10, 2021

(54) RESIN EXTRACTOR FOR ADDITIVE MANUFACTURING

(71) Applicant: Carbon, Inc., Redwood City, CA (US)

(72) Inventors: Michael Murillo, Menlo Park, CA (US); Gregory W. Dachs, II, San Mateo, CA (US)

(73) Assignee: Carbon, Inc., Redwood City, CA (US)

( * ) Notice: Subject to any disclaimer, the term of this patent is extended or adjusted under 35 U.S.C. 154(b) by 0 days.

(21) Appl. No.: 17/048,349

(22) PCT Filed: Apr. 22, 2019

(86) PCT No.: PCT/US2019/028539
§ 371 (c)(1),
(2) Date: Oct. 16, 2020

(87) PCT Pub. No.: WO2019/209732
PCT Pub. Date: Oct. 31, 2019

(65) Prior Publication Data
US 2021/0086450 A1  Mar. 25, 2021

Related U.S. Application Data

(60) Provisional application No. 62/661,421, filed on Apr. 23, 2018, provisional application No. 62/772,858, filed on Nov. 29, 2018.

(51) Int. Cl.
*B29C 64/35* (2017.01)
*B29C 64/124* (2017.01)
(Continued)

(52) U.S. Cl.
CPC ............ *B29C 64/35* (2017.08); *B29C 64/124* (2017.08); *B29C 64/245* (2017.08); *B33Y 10/00* (2014.12); *B33Y 30/00* (2014.12)

(58) Field of Classification Search
CPC ....... B29C 64/10; B29C 64/35; B29C 64/245; B29C 64/124; B33Y 10/00; B33Y 30/00; B33Y 40/00
See application file for complete search history.

(56) References Cited

U.S. PATENT DOCUMENTS 3,013,365 A   12/1961  Harper
4,087,924 A    5/1978  Fujimoro et al.
(Continued)

FOREIGN PATENT DOCUMENTS

DE   102014010501 A1   1/2016
EP       1700656 A2    9/2006
(Continued)

OTHER PUBLICATIONS

"International Preliminary Report on Patentability", for PCT/US2019/028539 dated Mar. 24, 2020, 21 pages.
(Continued)

*Primary Examiner* — Joseph S Del Sole
*Assistant Examiner* — Baileigh Kate Darnell
(74) *Attorney, Agent, or Firm* — Myers Bigel, P.A.

(57) ABSTRACT

A method of separating excess resin (15) from at least one object (11), includes: (a) stereolithographically producing at least one object (11) on at least one carrier platform (10), each carrier platform (10) having a planar build surface to which at least one object (11) is connected, each object (11) carrying excess resin (15) on a surface thereof; then (b) mounting each carrier platform (10) to a rotor (31); (c) centrifugally separating excess resin (15) from each object (11) by spinning the rotor (31) with each carrier platform (10) connected thereto while each object (11) remains connected to each carrier platform (10); and then (d) removing
(Continued)

each carrier platform (10) from the rotor (31) with each object (11) thereon, with excess resin (15) separated therefrom.

17 Claims, 3 Drawing Sheets

(51) Int. Cl.
  *B33Y 10/00* (2015.01)
  *B33Y 40/00* (2020.01)
  *B33Y 30/00* (2015.01)
  *B29C 64/245* (2017.01)

(56) References Cited

U.S. PATENT DOCUMENTS

| | | | |
|---|---|---|---|
| 5,122,441 A | 6/1992 | Lawton et al. | |
| 5,236,637 A | 8/1993 | Hull | |
| 5,248,456 A * | 9/1993 | Evans, Jr. | B29C 64/35 264/401 |
| 5,355,638 A * | 10/1994 | Hoffman | B24B 31/0212 451/32 |
| 5,391,072 A | 2/1995 | Lawton et al. | |
| 5,482,659 A * | 1/1996 | Sauerhoefer | B33Y 40/00 264/401 |
| 7,438,846 B2 | 10/2008 | John | |
| 7,709,544 B2 | 5/2010 | Doyle et al. | |
| 7,845,930 B2 | 12/2010 | Shkolnik et al. | |
| 7,892,474 B2 | 2/2011 | Shkolnik et al. | |
| 8,110,135 B2 | 2/2012 | El-Siblani | |
| 9,205,601 B2 | 12/2015 | Desimone et al. | |
| 9,211,678 B2 | 12/2015 | Desimone et al. | |
| 9,216,546 B2 | 12/2015 | Desimone et al. | |
| 9,360,757 B2 | 6/2016 | Desimone et al. | |
| 9,498,920 B2 | 11/2016 | Desimone et al. | |
| 9,511,546 B2 * | 12/2016 | Chen | B29C 64/124 |
| 9,993,974 B2 | 6/2018 | Desimone et al. | |
| 10,016,938 B2 | 7/2018 | Desimone et al. | |
| 10,093,064 B2 | 10/2018 | Desimone et al. | |
| 10,144,181 B2 | 12/2018 | Desimone et al. | |
| 10,150,253 B2 | 12/2018 | Desimone et al. | |
| 10,596,755 B2 | 3/2020 | Desimone et al. | |
| 10,618,215 B2 | 4/2020 | Desimone et al. | |
| 2004/0148048 A1 * | 7/2004 | Farnworth | B29C 64/135 700/119 |
| 2004/0159340 A1 | 8/2004 | Hiatt et al. | |
| 2006/0022379 A1 * | 2/2006 | Wicker | B33Y 30/00 264/255 |
| 2007/0179655 A1 * | 8/2007 | Farnworth | B33Y 30/00 700/114 |
| 2008/0087298 A1 * | 4/2008 | Katou | B08B 3/12 134/1 |
| 2009/0283119 A1 | 11/2009 | Moussa et al. | |
| 2011/0089610 A1 | 4/2011 | El-Siblani et al. | |
| 2013/0292862 A1 | 11/2013 | Joyce | |
| 2013/0295212 A1 | 11/2013 | Chen et al. | |
| 2015/0331402 A1 | 11/2015 | Lin et al. | |
| 2015/0360419 A1 | 12/2015 | Willis et al. | |
| 2016/0137839 A1 * | 5/2016 | Rolland | C08K 3/013 522/81 |
| 2017/0129167 A1 | 5/2017 | Castanon | |
| 2017/0129169 A1 | 5/2017 | Batchelder et al. | |
| 2017/0173872 A1 | 6/2017 | McCall et al. | |
| 2017/0312763 A1 | 11/2017 | Mackel et al. | |
| 2018/0029311 A1 | 2/2018 | Depalma et al. | |
| 2019/0029311 A1 | 1/2019 | Shin et al. | |
| 2019/0126547 A1 | 5/2019 | Desimone et al. | |
| 2019/0224917 A1 | 7/2019 | Venkatakrishnan et al. | |
| 2019/0389127 A1 | 12/2019 | Desimone et al. | |
| 2020/0139617 A1 | 5/2020 | Desimone et al. | |
| 2020/0337813 A1 * | 10/2020 | Kirchner | B29C 64/124 |

FOREIGN PATENT DOCUMENTS

| | | |
|---|---|---|
| EP | 1700686 A2 | 9/2006 |
| JP | 2001342204 A | 12/2001 |
| JP | 2015120261 A | 7/2015 |
| WO | 0172501 A1 | 10/2001 |
| WO | 2011086450 A2 | 7/2011 |
| WO | 2017194177 A1 | 11/2017 |
| WO | 2018111548 A1 | 6/2018 |
| WO | 2019209732 A1 | 10/2019 |

OTHER PUBLICATIONS

"International Search Report and the Written Opinion of the International Searching Authority corresponding to International Patent Application No. PCT/US2019/028539 (17 pages) (dated Oct. 1, 2019)".

Dendukuri, Dhananjay, et al., "Continuous-flow lithography for high-throughput microparticle synthesis", Nature Materials, 5, 2006, 365-369.

Dendukuri, Dhananjay, et al., "Stop-flow lithography in a microfluidic device", The Royal Society of Chemistry, Lab on a Chip, 7, 2007, 818-828.

Dendurkuri, et al., ", Modeling of Oxygen-Inhibited Free Radical Photopolymerization in PDMS Microfluidic Device, Macromolecules, 2008, 41 (22), 8547-8556, published Oct. 21, 2008".

Morelli, Dean, "Protest to Canadian Patent Applications by Joseph DeSimone et al", Regarding Continuous Liquid Interphase Printing. Canadian patent applications CA2898098A1, CA 2898103A1, and CA2898106A1. Dec. 31, 2015. Canadian Intellectual Property Office, 37 pp.

Pan, Y, et al., "A Fast Mask Projection Stereolithography Process for Fabricating Digital Models in Minutes", J. Manufacturing Sci. and Eng. 134, Oct. 2012, 051011-1.

Stern, S. A., "The 'Barrer' Permeability Unit", Journal of Polymer Science: Part A-2, 6(11), 1968, 1933-1934.

Tumbleston, John R., et al., "Continuous liquid interface production of 3D Objects", Science, 347(6228), 2015, 1349-1352.

Yasuda, H., et al., "Permeability of Polymer Membranes to Dissolved Oxygen", Journal of Polymer Science, 4, 1966, 1314-1316.

* cited by examiner

RESIN EXTRACTOR FOR ADDITIVE MANUFACTURING

RELATED APPLICATIONS

This application is a 35 U.S.C. § 371 national phase entry of International Application No. PCT/US2019/028539, filed Apr. 22, 2019, which claims the benefit of United States Provisional Patent Applications Serial Nos. 62/661,421, filed Apr. 23, 2018, and 61/772,858, filed Nov. 29, 2018, the disclosures of which are incorporated by reference herein in their entirety.

FIELD OF THE INVENTION

The present invention concerns methods of additive manufacturing, and particularly concerns methods of extracting or removing excess resin from objects following their production by top-down or bottom-up stereolithography.

BACKGROUND OF THE INVENTION

A group of additive manufacturing techniques sometimes referred to as "stereolithography" create a three-dimensional object by the sequential polymerization of a light polymerizable resin. Such techniques may be "bottom-up" techniques, where light is projected into the resin onto the bottom of the growing object through a light transmissive window, or "top down" techniques, where light is projected onto the resin on top of the growing object, which is then immersed downward into a pool of resin.

The recent introduction of a more rapid stereolithography technique sometimes referred to as continuous liquid interface production (CLIP) has expanded the usefulness of stereolithography from prototyping to manufacturing. See J. Tumbleston, D. Shirvanyants, N. Ermoshkin et al., *Continuous liquid interface production of 3D objects*, SCIENCE 347, 1349-1352 (published online 16 Mar. 2015); U.S. Pat. Nos. 9,211,678; 9,205,601; and 9,216,546 to DeSimone et al.; see also R. Janusziewicz, et al., *Layerless fabrication with continuous liquid interface production*, PNAS 113, 11703-11708 (18 Oct. 2016).

Dual cure resins for additive manufacturing were introduced shortly after the introduction of CLIP, expanding the usefulness of stereolithography for manufacturing a broad variety of objects still further. See Rolland et al., U.S. Pat. Nos. 9,676,963, 9,453,142 and 9,598,606; J. Poelma and J. Rolland, Rethinking digital manufacturing with polymers, SCIENCE 358, 1384-1385 (15 Dec. 2017).

Stereolithography resins—both conventional and dual cure—are generally viscous, and excess, unpolymerized, resins adhere to objects after they have been produced. Various wash techniques for removing excess resin are known (see, for example, W. McCall et al., *Wash liquids for use in additive manufacturing with dual cure resins*, US Patent Application Pub. No. 2017/0173872), but such techniques are generally slow, are not adapted for high throughput manufacturing situations, may require large amounts of wash liquids, and—because the excess resin is carried away in the wash liquid—generally preclude collection and use of the excess resin in subsequent stereolithographic production steps. Accordingly, there is a need for new techniques for removing excess resin from additively manufactured products.

SUMMARY OF THE INVENTION

A method of separating excess resin from at least one object includes the steps of: (a) stereolithographically producing at least one object (e.g., two, three or more) on at least one carrier platform (e.g., two, three, four or more), each carrier platform having a planar build surface to which the object(s) is/are connected, each object carrying excess resin on a surface thereof; then (b) mounting each carrier platform to a rotor; (c) centrifugally separating excess resin from each object by spinning the rotor with each carrier platform connected thereto, while each object remains connected to its corresponding carrier platform; and then (d) removing each carrier platform from the rotor with its corresponding object(s) remaining thereon, but with excess resin separated therefrom.

In some embodiments, the centrifugally separating step is carried out with each carrier platform mounted to the rotor with the build surface oriented perpendicularly to a radius of the rotor and tangentially to an axis of rotation of said rotor.

In some embodiments, the method includes warming the excess resin sufficiently to reduce the viscosity thereof during the centrifugally separating step.

In some embodiments, the method includes applying a solvent (e.g., by spraying) to the excess resin in an amount sufficient to reduce the viscosity thereof during the centrifugally separating step.

In some embodiments, the centrifugally separating step is carried out in a gas (e.g., air, an inert gas) at ambient pressure or a pressure less than ambient pressure.

In some embodiments, the rotor includes a primary rotor and a plurality of secondary rotors mounted on the primary rotor, wherein each carrier platform is mounted on one of the secondary rotors, and wherein the spinning step is carried out by rotating the primary rotor while rotating (e.g., counter-rotating) the secondary rotors.

In some embodiments, the method can further include the steps of: (e) collecting the centrifugally separated excess resin, then (f) optionally combining the excess resin with additional resin; and then (g) stereolithographically producing at least one additional object from the collected (and optionally diluted) excess resin.

In some embodiments, the object includes an intermediate object produced from a dual cure resin, the method can further include the steps of: (h) optionally separating each the object from each the carrier platform; and then (i) further curing (e.g., by heating and/or microwave irradiating) the object to produce a finished object.

In some embodiments, the object comprises (in whole or in part) an open lattice structure. In some embodiments, the object includes one or more internal cavities, has at least one opening formed therein in fluid communication the cavity, the opening configured for excess resin within the cavity to flow therethrough and out of the cavity during the centrifugally separating step. In some embodiments, the object comprises a dental model or die.

In some embodiments, the object(s) on each carrier platform have a higher drag orientation and a lower drag orientation, and the centrifugally separating step is carried out with the carrier platform(s) mounted on the rotor with the object(s) positioned in the lower-drag orientation.

In some embodiments, the object(s) has or have a long dimension, and the object(s) is or are oriented on the carrier platform with the long dimension substantially parallel to the planar build surface (e.g., plus or minus 20 or 30 degrees).

In some embodiments, the method includes measuring at least one characteristic or parameter associated with each carrier platform using at least one force gauge that engages or interfaces with the at least one carrier platform. In some embodiments, the characteristic or parameter includes the amount of resin separated from each object on the at least one carrier platform and/or the amount of resin remaining on each object on the at least one carrier platform (e.g., during the centrifugally separating step).

A further aspect of the present invention is a centrifugal extractor apparatus configured for carrying out a method as described above, and in further detail below.

For example, an apparatus for separating excess resin from at least one object, includes: a collection vessel; and a rotor in the collection vessel and configured to receive at least one carrier platform having at least one object thereon and to spin with each carrier platform connected thereto such that excess resin from each object is removed and optionally received in the collection vessel.

In some embodiments, the collection vessel is sealable. The apparatus may further include a vacuum line connected to the collection vessel and configured to reduce pressure in the collection vessel to reduce drag on each object as it is spun by the rotor.

In some embodiments, the apparatus includes a resin drain line connected to the collection vessel and configured to collect the excess resin for recycling in a subsequent stereolithographic production process.

In some embodiments, the apparatus includes at least one force gauge that engages the at least one carrier platform, with each force gauge configured to measure at least one characteristic or parameter associated with the carrier platform to which it is engaged. In some embodiments, the at least one characteristic or parameter includes the amount of resin separated from each object on the carrier platform and/or the amount of resin remaining on each object on the carrier platform.

The foregoing and other objects and aspects of the present invention are explained in greater detail in the drawings herein and the specification set forth below. The disclosures of all United States patent references cited herein are to be incorporated herein by reference.

DETAILED DESCRIPTION OF ILLUSTRATIVE EMBODIMENTS

Figure 1:
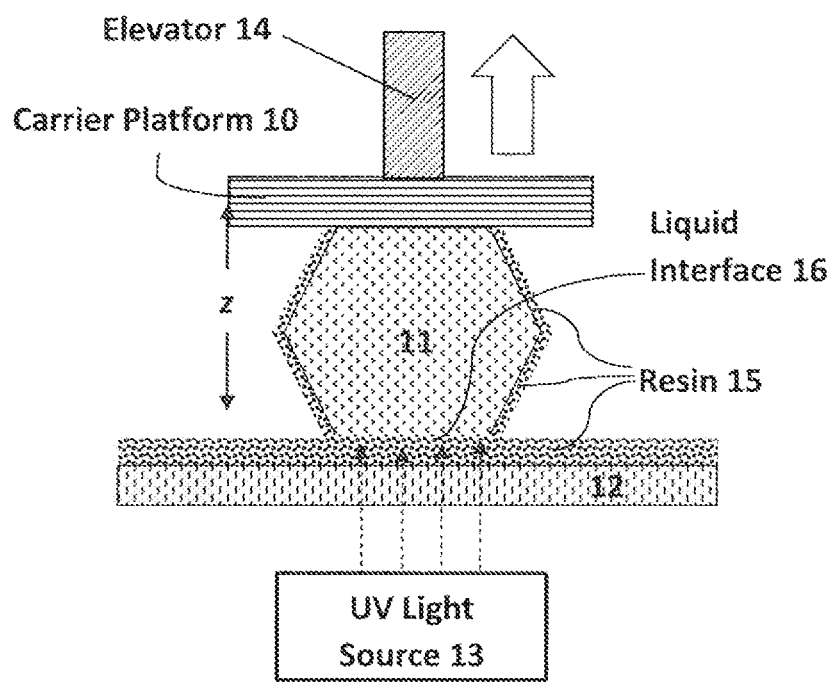
FIG. 1 schematically illustrates one embodiment of stereolithography, in which excess resin is carried on the surface of the object being produced.

The present invention is now described more fully hereinafter with reference to the accompanying drawings, in which embodiments of the invention are shown. This invention may, however, be embodied in many different forms and should not be construed as limited to the embodiments set forth herein; rather these embodiments are provided so that this disclosure will be thorough and complete and will fully convey the scope of the invention to those skilled in the art.

Like numbers refer to like elements throughout. In the figures, the thickness of certain lines, layers, components, elements or features may be exaggerated for clarity.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements components and/or groups or combinations thereof, but do not preclude the presence or addition of one or more other features, integers, steps, operations, elements, components and/or groups or combinations thereof.

As used herein, the term "and/or" includes any and all possible combinations or one or more of the associated listed items, as well as the lack of combinations when interpreted in the alternative ("or").

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and claims and should not be interpreted in an idealized or overly formal sense unless expressly so defined herein. Well-known functions or constructions may not be described in detail for brevity and/or clarity.

It will be understood that when an element is referred to as being "on," "attached" to, "connected" to, "coupled" with, "contacting," etc., another element, it can be directly on, attached to, connected to, coupled with and/or contacting the other element or intervening elements can also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature can have portions that overlap or underlie the adjacent feature.

Spatially relative terms, such as "under," "below," "lower," "over," "upper" and the like, may be used herein for ease of description to describe an element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus the exemplary term "under" can encompass both an orientation of over and under. The device may otherwise be oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only, unless specifically indicated otherwise.

It will be understood that, although the terms first, second, etc., may be used herein to describe various elements, components, regions, layers and/or sections, these elements, components, regions, layers and/or sections should not be limited by these terms. Rather, these terms are only used to distinguish one element, component, region, layer and/or section, from another element, component, region, layer and/or section. Thus, a first element, component, region, layer or section discussed herein could be termed a second element, component, region, layer or section without departing from the teachings of the present invention. The sequence of operations (or steps) is not limited to the order presented in the claims or figures unless specifically indicated otherwise.

1. Stereolithography Apparatus and Resins.

Resins for additive manufacturing are known and described in, for example, DeSimone et al., U.S. Pat. Nos. 9,211,678; 9,205,601; and 9,216,546. Dual cure resins for additive manufacturing are known and described in, for example, Rolland et al., U.S. Pat. Nos. 9,676,963; 9,598,606; and 9,453,142. Non-limiting examples of dual cure resins include, but are not limited to, resins for producing objects comprised of polymers such as polyurethane, polyurea, and copolymers thereof; objects comprised of epoxy; objects comprised of cyanate ester; objects comprised of silicone, etc.

Techniques for additive manufacturing are known. Suitable techniques include bottom-up or top-down additive manufacturing, generally known as stereolithography. Such methods are known and described in, for example, U.S. Pat. No. 5,236,637 to Hull, U.S. Pat. Nos. 5,391,072 and 5,529,473 to Lawton, U.S. Pat. No. 7,438,846 to John, U.S. Pat. No. 7,892,474 to Shkolnik, U.S. Pat. No. 8,110,135 to El-Siblani, U.S. Patent Application Publication No. 2013/0292862 to Joyce, US Patent Application Publication No. 2013/0295212 to Chen et al, and U.S. Patent Application Publication No. 2018/0290374 to Willis and Adzima. The disclosures of these patents and applications are incorporated by reference herein in their entirety.

FIG. 1 schematically illustrates one embodiment of stereolithographic production (in this case a bottom-up technique). A carrier platform 10 carries the object being produced, which is above a light-transmissive window 12. A light source, such as a UV light source 13, projects spatially and temporally patterned light through the window 12 into resin 15 resting on top of the window, while the carrier platform 10 and window 12 are advanced away from one, typically another, in the z direction (for example, by means of an elevator mechanism 14 to which the carrier platform 10 is connected). Note resin 15 adhered to the surface of object 11 as well as on top of window 12.

In some embodiments, the object is formed by continuous liquid interface production (CLIP). CLIP is known and described in, for example, PCT Application Nos. PCT/US2014/015486 (U.S. Pat. No. 9,211,678); PCT/US2014/015506 (U.S. Pat. No. 9,205,601), PCT/US2014/015497 (U.S. Pat. No. 9,216,546), and in J. Tumbleston, D. Shirvanyants, N. Ermoshkin et al., Continuous liquid interface production of 3D Objects, *Science* 347, 1349-1352 (2015). See also R. Janusziewcz et al., Layerless fabrication with continuous liquid interface production, *Proc. Natl. Acad. Sci. USA* 113, 11703-11708 (Oct. 18, 2016). In some embodiments, CLIP employs features of a bottom-up three-dimensional fabrication as described above, but the irradiating and/or said advancing steps are carried out while also concurrently maintaining a stable or persistent liquid interface between the growing object and the build surface or window, such as by: (i) continuously maintaining a dead zone of polymerizable liquid in contact with said build surface, and (ii) continuously maintaining a gradient of polymerization zone (such as an active surface) between the dead zone and the solid polymer and in contact with each thereof, the gradient of polymerization zone comprising the first component in partially-cured form. In some embodiments of CLIP, the optically transparent member comprises a semipermeable member (e.g., a fluoropolymer), and the continuously maintaining a dead zone is carried out by feeding an inhibitor of polymerization through the optically transparent member, thereby creating a gradient of inhibitor in the dead zone and optionally in at least a portion of the gradient of polymerization zone. Other approaches for carrying out CLIP that can be used in the present invention and obviate the need for a semipermeable "window" or window structure include utilizing a liquid interface comprising an immiscible liquid (see L. Robeson et al., WO 2015/164234, published Oct. 29, 2015), generating oxygen as an inhibitor by electrolysis (see I Craven et al., WO 2016/133759, published Aug. 25, 2016), and incorporating magnetically positionable particles to which the photoactivator is coupled into the polymerizable liquid (see J. Rolland, WO 2016/145182, published Sep. 15, 2016). See also U.S. Patent Application Publication No. 2018/0243976 to Feller; U.S. Patent Application Publication No. 2018/0126630 to Panzer and Tumbleston; and U.S. Patent Application Publication No. 2018/0290374 to Willis and Adzima.

Other examples of methods and apparatus for carrying out particular embodiments of CLIP include, but are not limited to: Batchelder et al., Continuous liquid interface production system with viscosity pump, US Patent Application Pub. No. US 2017/0129169 (May 11, 2017); Sun and Lichkus, Three-dimensional fabricating system for rapidly producing objects, US Patent Application Pub. No. US 2016/0288376 (Oct. 6, 2016); Willis et al., 3d print adhesion reduction during cure process, US Patent Application Pub. No. US 2015/0360419 (Dec. 17, 2015); Lin et al., Intelligent 3d printing through optimization of 3d print parameters, US Patent Application Pub. No. US 2015/0331402 (Nov. 19, 2015); and D. Castanon, Stereolithography System, US Patent Application Pub. No. US 2017/0129167 (May 11, 2017).

In the embodiment of FIG. 1 the liquid interface 16 is shown, but in the present invention CLIP is not required, and top-down stereolithography may be used as well as bottom-up stereolithography.

After the object is formed, it is typically cleaned, and then further cured, preferably by baking (although further curing may in some embodiments be concurrent with the first cure, or may be by different mechanisms such as contacting to water, as described in U.S. Pat. No. 9,453,142 to Rolland et al.).

2. Resin Extractor Apparatus and Methods.

Figure 2:
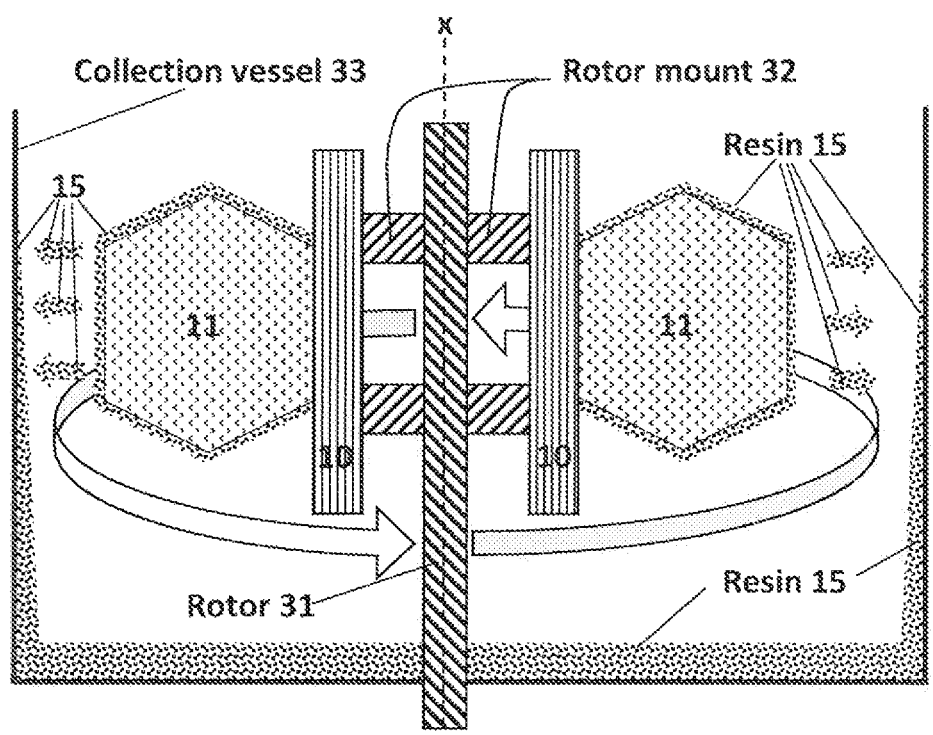
FIG. 2 schematically illustrates one embodiment of a method and apparatus for extracting resins from stereolithographically produced objects.
Figure 3:
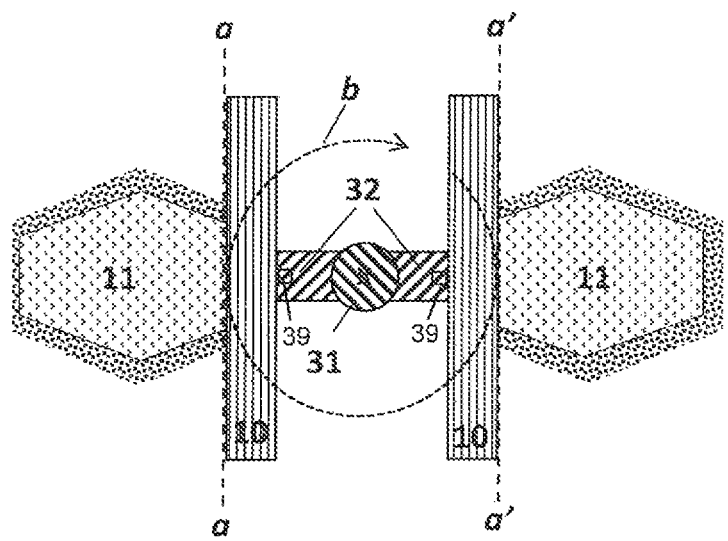
FIG. 3 is a top plan view of a portion of the method and apparatus of FIG. 2.

FIGS. 2-3 schematically illustrate non-limiting embodiments of a method and apparatus of the present invention. The apparatus comprises a rotor 31 having at least one or a plurality of mounts 32 to which carrier platform(s) 10 may be removably secured. The resulting assembly can optionally, but preferably, be contained in a collection vessel 33. The platforms have stereolithographically produced object(s) 11 thereon, which are coated with excess resin 15. Upon rotation of the rotor/mount/platform/object assembly, resin is centrifugally spun off of the objects 11, where it may be collected in the collection vessel 33. The carrier platforms 10 are preferably aligned perpendicularly to the rotor, and the carrier platforms can have planar top surfaces which are aligned tangentially to the rotor axis of rotation b (see FIG. 3). The mounts 32 may extend perpendicular to the the rotor axis of rotation b and the build surfaces of the carrier platforms 10 may be parallel to the rotor axis of rotation b.

The rotor 31 can be driven by any suitable drive mechanism (not shown) including but not limited to electric, pneumatic, and hydraulic drives. The rotor may be spun at any suitable speed, and in some embodiments is spun at a maximum speed between 100, 200 or 400 revolutions per minute (rpm) to 1,000, 1,200, or 2,000 rpm, or more. There are preferably periods of acceleration and deceleration at the beginning and end of each centrifugally separating step before maximum speed is achieved, and the choice of maximum speed will depend on factors such as overall duration of the centrifugally separating step (with longer durations allowing for lower speeds), viscosity of excess resin, temperature, geometry of the object(s), any use of warming or solvents (discussed below), the amount of drag or wind the objects can withstand without damage, the resonant frequencies of the objects or the apparatus, etc. In some embodiments, the duration of the centrifugally separating step can be from 20 or 40 seconds to 2, 5 or 10 minutes, or more. Centrifugally separating steps can optionally be repeated, and steps between such repeats (such as a solvent dunk or spray) may be introduced if desired.

Automatic balancers (not shown) can be operatively associated with the rotors, such as those described in, for example, U.S. Pat. No. 2,584,942 to Thearle; U.S. Pat. No. 4,157,781 to Maruyama; U.S. Pat. No. 5,376,063 to Greenstein; U.S. Pat. No. 5,862,553 to Haberl; and U.S. Pat. No. 6,578,225 to Jonsson, the disclosures of which are incorporated herein by reference. In another embodiment, the mount(s) 32 may be radially adjustable to manually balance the rotor 31 once carrier platform(s) 10 and their corresponding object(s) 11 are mounted thereto.

Referring to FIG. 3, the apparatus may include one or more force gauges 39. For example, the force gauges 39 may be on the mounts 32. The force gauges 39 may be operatively associated with a controller and used for: determining the amount of resin removed and/or the amount of resin remaining (e.g., on each object); closed-loop determinations of ideal spin cycles; determining appropriate spin program and part removal adjustments; predictive fault management (e.g., determine if something has broken or changed that could be a hazard); and/or detecting if a carrier platform is present (e.g., connected to the rotor) and is the correct weight. The force gauges 39 may be single point, compression, or planar beam type load cells. Each force gauge 39 may engage or interface with the restrained portion of one or the carrier platforms 10.

Figure 4:
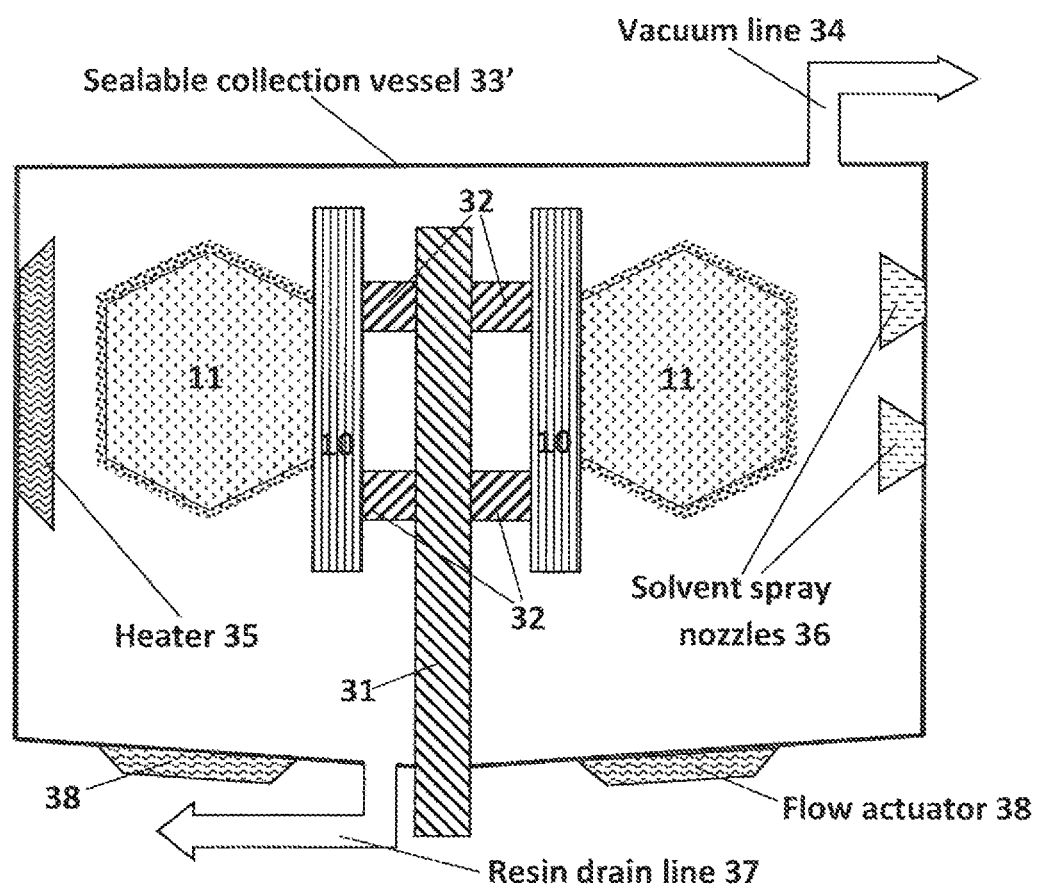
FIG. 4 schematically illustrates a further non-limiting embodiment of an apparatus of the present invention.

A further embodiment, schematically illustrated in FIG. 4, shows various additional steps and features that may be included in some embodiments of the methods and apparatus of the present invention. The collection vessel can be provided with a hood, lid, or access door, and appropriate seal, so that the pressure therein may be reduced below ambient pressure via a vacuum line 34, sufficiently to reduce drag on the objects as they are spun in the gas atmosphere. The separating step can be carried out in a gas, typically air at ambient pressure, but a supply line (not shown) for an inert gas such as argon, nitrogen, or carbon dioxide can be included, if a resin and/or solvent is volatile or flammable. Heaters (e.g., infrared heaters) 35 may be included to warm the objects and the excess resin, sufficiently to reduce the viscosity thereof during the centrifugally separating step (and thereby reducing the maximum speed at which rotation is carried out, and/or the duration of the centrifugally separating step). Spray nozzles 36 may be included to apply a solvent such as isopropanol to the excess resin, in an amount sufficient to reduce the viscosity thereof during the centrifugally separating step, and again reduce the maximum speed or duration of the separating step. Air blades or air jets may be included in addition to, or instead of, such spray nozzles, again to aid in removal of excess resin from the objects. A resin drain line 37 can be included to facilitate collection of resin, such as when resin is to be recycled to a subsequent stereolithographic production step, and flow actuators 38 (such as shakers, vibrators, ultrasonic vibrators, etc.) can be provided in operative association with the collection vessel to encourage flow of the collected, viscous, resin. One or more of these features may be useful for the production of objects that are dental models and/or dies, which may be formed by photopolymerizing a viscous resin. The collection vessel may include a removable liner (not shown), such as a rigid or flexible polymer liner, to aid in cleaning the vessel, and/or in collecting excess resin. Similarly, the objects may be wrapped or covered with a removable cover (not shown) such as a rigid or flexible polymer wrap or cover, to aid in collection of excess resin in a more localized fashion.

Figure 5:
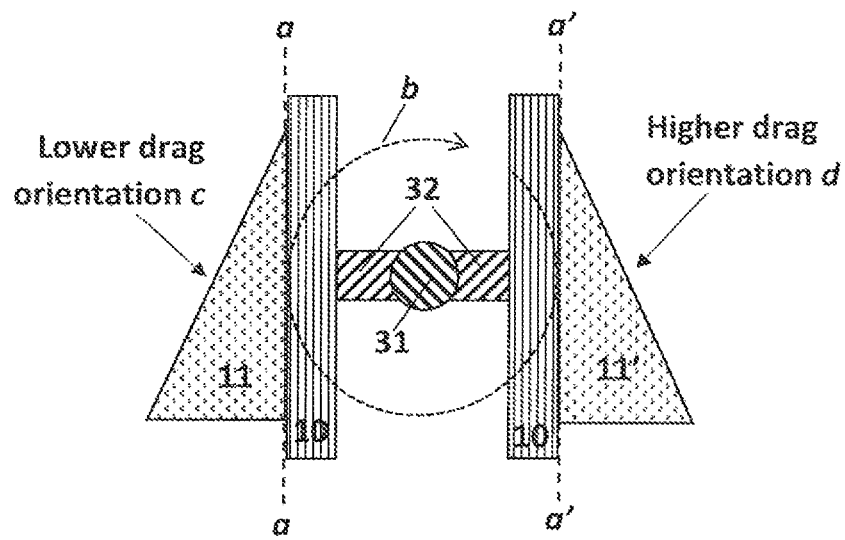
FIG. 5 is a top plan view of a portion of a method and apparatus similar to FIG. 2, except now showing alternate orientations of objects thereon.

As shown in FIG. 5, in some embodiments the object(s) 11 has or have a long dimension, and in some embodiments those objects may be oriented on the carrier platform 10 with the long dimension substantially parallel to the planar build surface (e.g., plus or minus 20 or 30 degrees). In other embodiments, however, it may be desired to have the object(s) long dimension substantially perpendicular to the carrier platform (e.g., plus or minus 20 or 30 degrees), such as where many objects are carried by the same carrier platform in a "high density" production thereof As also illustrated in FIG. 5, depending on the direction of rotation during centrifugation, objects 11, 11' will have a variety of higher-drag orientations, and a variety of lower-drag orientations, on the platform 10. In some embodiments, it will be preferable to orient the object (e.g., during its stereolithographic production, or by manipulation of the platform on the mount 32) so that it is positioned on the rotor in a lower-drag orientation. Note that, in these embodiments, it may not be necessary to position the object in its lowest drag orientation, as other considerations (such as balance, printability during additive production, etc.) may weigh against that positioning. In addition, if desired, aerodynamic baffles (not shown) may be included on the rotor, or attachable to the rotor and/or the carrier platforms, to shield the objects from excess wind load or drag during rotation. Similarly, if desired, the mount may be a rotatable mount, able to rotate about an axis normal to the build surface (e.g., the platform's (and object's) Z axis), and then lock in place, to provide advantageous positioning of the object for reducing wind load or drag.

Figure 6:
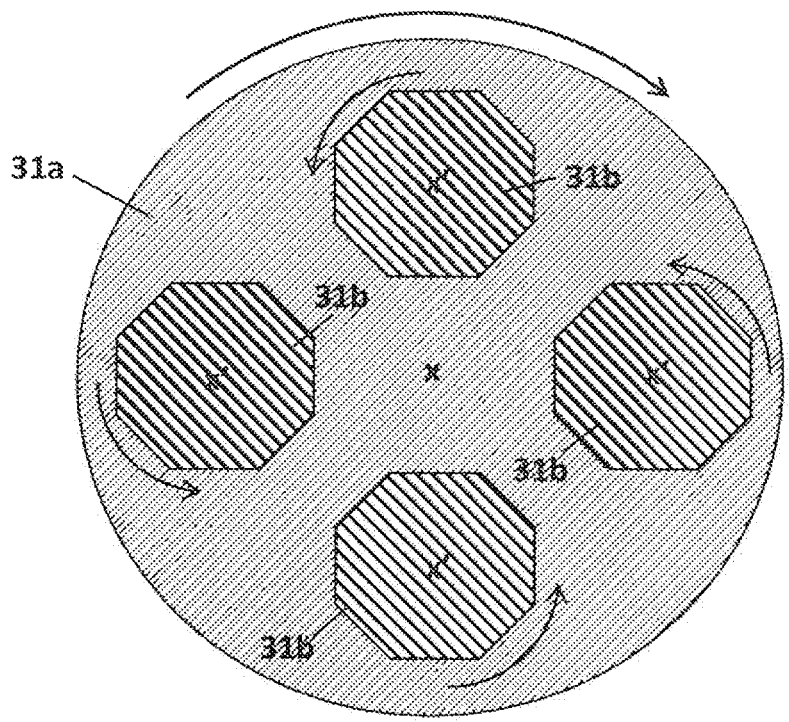
FIG. 6 is a schematic top plan view of another embodiment of the present invention, in which a compound rotor is implemented.

In the embodiment schematically illustrated in FIG. 6, the rotor is a compound rotor comprised of a primary rotor 31*a* and a plurality of secondary rotors 31*b* mounted on the primary rotor. One, two, three or more carrier platforms 10 can be mounted on each secondary rotor 31*b* in like manner as described above, and the spinning step is carried out by rotating the primary rotor 31*a* while counter-rotating the secondary rotors 31*b*, thereby subjecting the carrier platforms to compound rotation. The primary and secondary rotors may be driven by any suitable drive mechanism, including but not limited to those set forth in U.S. Pat. No. 3,013,365 to Harper; U.S. Pat. No. 4,776,135 to Thum; or U.S. Pat. No. 5,355,638 to Hoffman, the disclosures of which are incorporated herein by reference.

The foregoing is illustrative of the present invention, and is not to be construed as limiting thereof. The invention is defined by the following claims, with equivalents of the claims to be included therein.

We claim:

1. A method of separating excess resin from at least one object, comprising:
   (a) stereolithographically producing at least one object on at least one carrier platform using an elevator mechanism to advance said at least one carrier platform away from a window, said at least one carrier platform having a planar build surface to which at least one object is connected, said at least one object carrying excess resin on a surface thereof; then
   (b) mounting said at least one carrier platform to a rotor;
   (c) centrifugally separating excess resin from said at least one object by spinning said rotor with said at least one carrier platform connected thereto while each said at least one object remains connected to each said carrier platform; and then
   (d) removing said at least one carrier platform from said rotor with said at least one object thereon, with excess resin separated therefrom,
   wherein said centrifugally separating step is carried out with said at least one carrier platform mounted to said rotor with said planar build surface oriented parallel to an axis of rotation of said rotor.

2. The method of claim 1, wherein said centrifugally separating step is carried out with said at least one carrier platform mounted to said rotor with said planar build surface oriented perpendicularly to a radius of the rotor and tangentially to said axis of rotation of said rotor.

3. The method of claim 1, wherein said at least one carrier platform comprises at least two or three carrier platforms.

4. The method of claim 1, wherein said at least one carrier platform has at least two or three stereolithographically produced objects connected thereto.

5. The method of claim 1, further comprising warming said excess resin to reduce the viscosity thereof during said centrifugally separating step.

6. The method of claim 1, further comprising applying a solvent to said excess resin to reduce the viscosity thereof during said centrifugally separating step.

7. The method of claim 1, wherein said centrifugally separating step is carried out in a gas at ambient pressure or a pressure less than ambient pressure.

8. The method of claim 1, wherein said rotor comprises a primary rotor and a plurality of secondary rotors mounted on said primary rotor, wherein each said carrier platform is mounted on one of said secondary rotors, and wherein said spinning step is carried out by rotating said primary rotor while rotating said secondary rotors.

9. The method of claim 1, wherein said spinning is carried out at a speed of from 200 or 400 revolutions per minute (rpm) to 1,000 or 1,200 rpm, or more.

10. The method of claim 1, further comprising:
    (e) collecting said centrifugally separated excess resin, then
    (f) combining said centrifugally separated excess resin with additional resin; and then
    (g) stereolithographically producing at least one additional object from said centrifugally separated excess resin and/or said additional resin.

11. The method of claim 1, wherein said at least one object comprises an intermediate object produced from a dual cure resin, the method further comprising:
    (h) separating said at least one object from said at least one carrier platform; and then
    (i) further curing said at least one object to produce a finished object.

12. The method of claim 1, wherein said at least one object comprises a lattice and/or includes one or more internal cavities and has at least one opening formed therein in fluid communication with the one or more internal cavities and configured for excess resin within the one or more internal cavities to flow therethrough and out of the one or more internal cavities during the centrifugally separating step.

13. The method of claim 1, wherein said at least one object on said at least one carrier platform have a higher drag orientation and a lower drag orientation, and said centrifugally separating step is carried out with said at least one carrier platform mounted on said rotor with said at least one object positioned in said lower-drag orientation.

14. The method of claim 1, wherein said at least one object has or have a long dimension, and said at least one object is or are oriented on said at least one carrier platform with said long dimension substantially parallel to said planar build surface.

15. The method of claim 1 further comprising measuring at least one characteristic or parameter associated with said at least one carrier platform using at least one force gauge that engages or interfaces with said at least one carrier platform.

16. The method of claim 15 wherein said characteristic or parameter comprises an amount of resin separated from each object on said at least one carrier platform and/or an amount of resin remaining on each object on said at least one carrier platform.

17. The method of claim 1 further comprising removing said at least one carrier platform from the elevator mechanism before mounting said at least one carrier platform to the rotor.

* * * * *

UNITED STATES PATENT AND TRADEMARK OFFICE
CERTIFICATE OF CORRECTION

PATENT NO. : 11,084,216 B2
APPLICATION NO. : 17/048349
DATED : August 10, 2021
INVENTOR(S) : Murillo et al.

Page 1 of 1

It is certified that error appears in the above-identified patent and that said Letters Patent is hereby corrected as shown below:

In the Claims

Column 9, Line 14, Claim 1: Please correct "while each said" to read -- while said --

Signed and Sealed this
Fourteenth Day of December, 2021

Drew Hirshfeld
*Performing the Functions and Duties of the
Under Secretary of Commerce for Intellectual Property and
Director of the United States Patent and Trademark Office*